US008439685B2

(12) United States Patent
Shelley

(10) Patent No.: US 8,439,685 B2
(45) Date of Patent: May 14, 2013

(54) FIRE TRAINING DOOR ASSEMBLY

(76) Inventor: James Shelley, Garrison, NY (US)

( * ) Notice: Subject to any disclaimer, the term of this patent is extended or adjusted under 35 U.S.C. 154(b) by 366 days.

(21) Appl. No.: 12/847,900

(22) Filed: Jul. 30, 2010

(65) Prior Publication Data

US 2011/0025076 A1 Feb. 3, 2011

Related U.S. Application Data

(60) Provisional application No. 61/229,969, filed on Jul. 30, 2009.

(51) Int. Cl.
*G09B 19/00* (2006.01)

(52) U.S. Cl.
USPC .......................................................... 434/226

(58) Field of Classification Search .................. 434/219, 434/226, 247; 52/98, 204.1, 206, 213
See application file for complete search history.

(56) References Cited

U.S. PATENT DOCUMENTS

| | | | | |
|---|---|---|---|---|
| 5,906,493 | A * | 5/1999 | Bishop | 434/226 |
| 7,789,666 | B2 * | 9/2010 | Sovine et al. | 434/226 |
| 7,972,139 | B2 * | 7/2011 | Staub | 434/226 |
| 8,128,408 | B2 * | 3/2012 | Phillips et al. | 434/226 |
| 8,167,621 | B2 * | 5/2012 | Allen | 434/226 |
| 2005/0050816 | A1 * | 3/2005 | Manning et al. | 52/213 |
| 2009/0215014 | A1 * | 8/2009 | Walker | 434/226 |

OTHER PUBLICATIONS

Case 1:11-cv-07427-KBF, U.S. Distr. Ct. Southern District of New York, DI 12, Memorandum of Law in Support of Defendant's Motions (1) to Determine scope of Release and License; and (2) Seeking Construction of Claim Term from U.S. Patent No. 5,906,493.

Case 1:11-cv-07427-KBF, U.S. Distr. Ct. Southern District of New York, DI 18, Order.

* cited by examiner

*Primary Examiner* — Kurt Fernstrom
(74) *Attorney, Agent, or Firm* — Lucas & Mercanti, LLP

(57) ABSTRACT

A fire training door assembly includes a door hingably connected in a door frame including first and second vertical posts and an upper horizontal beam connecting the vertical posts. A cutout space is defined along one of the lateral sides of the door. The cutout space has an upper end, a lower end, and a side portion. The reinforced section of the second vertical post extends at least from the lower end to the upper end of said cutout space. The fire door assembly further includes a lock element movably arranged in the cutout space and a spring arranged between the lock element and the side portion urging the lock element toward the second side of the door against a stop element arranged on the door along the second lateral side of the door. The lock element is movable against an urgency of the spring toward the first lateral side of the door, whereby the forces required to move the lock element against the spring simulate the forces required to pry open a steel door. An adjustment device adjusts the urgency of the spring.

16 Claims, 13 Drawing Sheets

FIRE TRAINING DOOR ASSEMBLY

RELATED APPLICATIONS

This application claims priority from U.S. Provisional Patent Application Ser. No. 61/229,969, filed on Jul. 30, 2009, the entire contents of which are incorporated herein by reference.

BACKGROUND OF THE INVENTION

The present invention relates to a fire training door used by fire departments to train the skills required to gain access through locked doors.

Fire departments require specialized training equipment which prepare fire-fighters for the many situations which may be encountered during an actual fire. One of the many obstacles to be overcome is the requirement to gain access to any area behind a locked door, in particular steel doors or other structurally sound doors. One of the techniques used in this situation involves forcing the claw end of halligan tool (or the end of crow bar or other prying tool) between the side of the door and the door frame in an area proximate the locking bolt of the door, i.e., in an area between 6 inches above the bolt and 6 inches below the bolt. In order to perform this task of gaining access quickly and efficiently during an emergency situation, a firefighter needs to be practiced so that the placement and use of the halligan tool or other prying tool becomes second nature. Accordingly, a training door is needed which simulates actual forces necessary to open a door and is resettable so that the training door may be used repeatedly.

SUMMARY OF THE INVENTION

An object of the present invention is to provide a fire training door assembly that includes a locking mechanism that simulates actual forces necessary to open a door and is resettable.

The object is met by a fire training door assembly including a door frame including first and second vertical posts and an upper horizontal beam connecting the vertical posts, wherein a central portion of the second vertical post includes a reinforced section. The inventive door assembly also includes a door having a front, a rear, a first lateral side hingably connected to the first vertical post and a second lateral side, the door defining a cutout space along said second lateral side, the cutout space having an upper end, a lower end, and a side portion, the cutout having an open side at one of the front and rear of the door. A lock element is movably arranged in the cutout space and extends between the upper end and the lower end thereof. A cover is nondestructively removably connected to the door to cover at least a portion of the open side of the cutout such that the lock element is maintained in the cutout space, wherein the lock element is removable from the open side when the cover is removed from the door. A spring is arranged between the lock element and the side portion and urges the lock element toward the second side of the door against a stop element arranged on said door along the second lateral side of the door, the lock element being movable against an urgency of the spring toward the first lateral side, whereby the forces required to move the lock element against the spring simulate the forces required to pry open a steel door. An adjustment device is arranged in the door and configured so that it is operable by a user to adjust the urgency of said spring against which said lock element is movable.

The door includes a top rail and a bottom rail defining the top and bottom of the cutout space and a vertical support defining the side portion of the cutout space. The top rail, the bottom rail, and the vertical support are each made, for example, with angle iron.

The spring has a central section and two end sections. The central section is connected to one of the lock element or side portion of the cutout space, and the end sections of the spring resting resiliently against the other of the lock element and the side portions of the space.

The door assembly further comprises a reset device including a pivoting element with a first end pivotably connected to the door and a second end. A connecting element has a first end connected to the second end of the pivoting element and a second end of the connecting element is connected to the movable element. The pivoting element is pivotable for moving the movable element against the urgency of the spring. The pivoting element includes a cavity for receiving an end of the prying tool used to pry open the door. The first end of the pivoting element is pivotably connected to the cover of the cutout space.

The fire training door assembly may be portable in that it further includes legs attached at a first position proximate a bottom end of said door frame by brackets to support the door frame in an upright position. The legs and bracket are nondestructively removable from the bottom end and connectable proximate an opposing end of the door frame to support the door frame in an upside down position, wherein the door is in one of a right hand and left hand door configuration in the upright position and is in the other of the right hand and left hand configuration in the upside-down position.

The adjustment device includes a first element movable relative to the side portion of the cutout space and a user manipulable second element. The first element is translated toward or away from the lock element to increase or decrease the urgency of the spring. The first element is moved toward or away from the lock element in response to a rotation of the second element. The second element comprises a ring-shaped knob that protrudes from a slot on at least one of the front side and rear side of the door.

The fire training door assembly further includes a reinforced section at a central portion of the second vertical post, the reinforced section extending at least from the lower end to the upper end of the cutout space. The fire training door assembly may also have an extended ramp extending in a door opening direction from the second vertical post at a position of a bolt on the lock element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
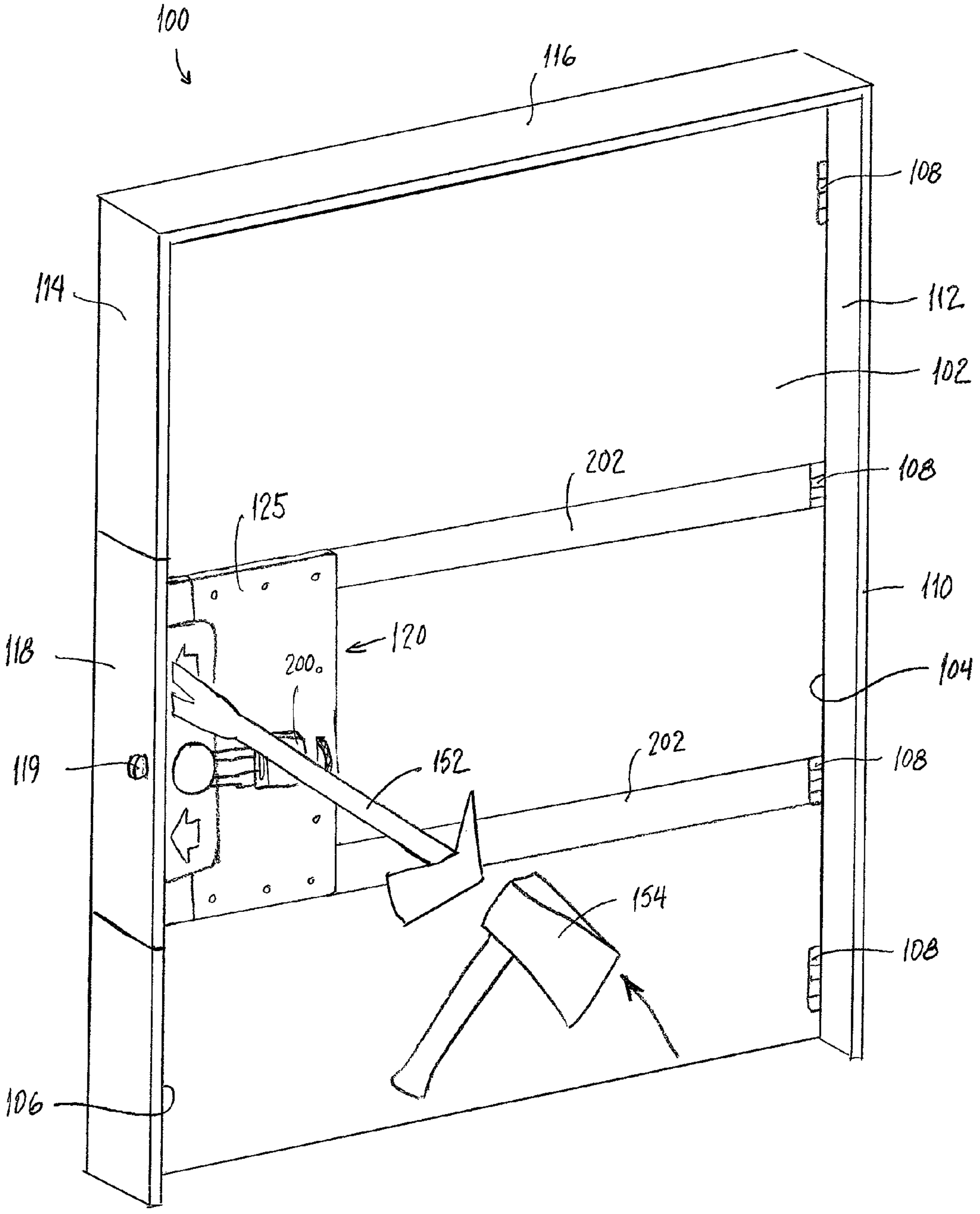
FIG. 1 is a perspective view of a fire door assembly according to an embodiment of the present invention.

FIG. 1 shows a fire training door assembly according to the present invention. A door 100 is arranged in a door frame 110 having two vertical supports 112, 114 and a horizontal beam 116 connecting the top ends of the two vertical supports. The door 100 has a front face 102, a rear face (not shown in FIG. 1), a first lateral side 104 and a second lateral side 106. The first lateral side 104 is connected to the vertical support 112 by hinges 108. The door 100 includes a lock mechanism 120 with a reset tool 200 which will be explained in more detail below. A front side cover 125 covers the front side of the lock mechanism 120. The vertical support 114 on the left side of FIG. 1 has reinforced section 118 made, for example, of C-channel iron and has a bolt hole 119 for receiving a door bolt. The fire training door assembly of FIG. 1 is designed to withstand the forces used by firefighters using a Halligan tool 152 (or other prying tool) and a sledge 154 (or other impacting tool) to pry open the door 100.

In a preferred embodiment, the door 100 includes one or more straps 202 to reinforce the door. The straps are 3/16 inch by 4 inch mild steel flat bar. In one embodiment, the straps 202 are stitch welded to the door. The straps 202 are applied to both sides of door 100. Straps 202 wrap around the edge of the door, preferably at the points where hinges 108 attach the door 100 to vertical support 112. It should be noted that the straps 202 are alternatively bolted or screwed to the door 100. In one embodiment, separate straps that do not wrap around the door edge are used on each side of the door.

Figure 2:
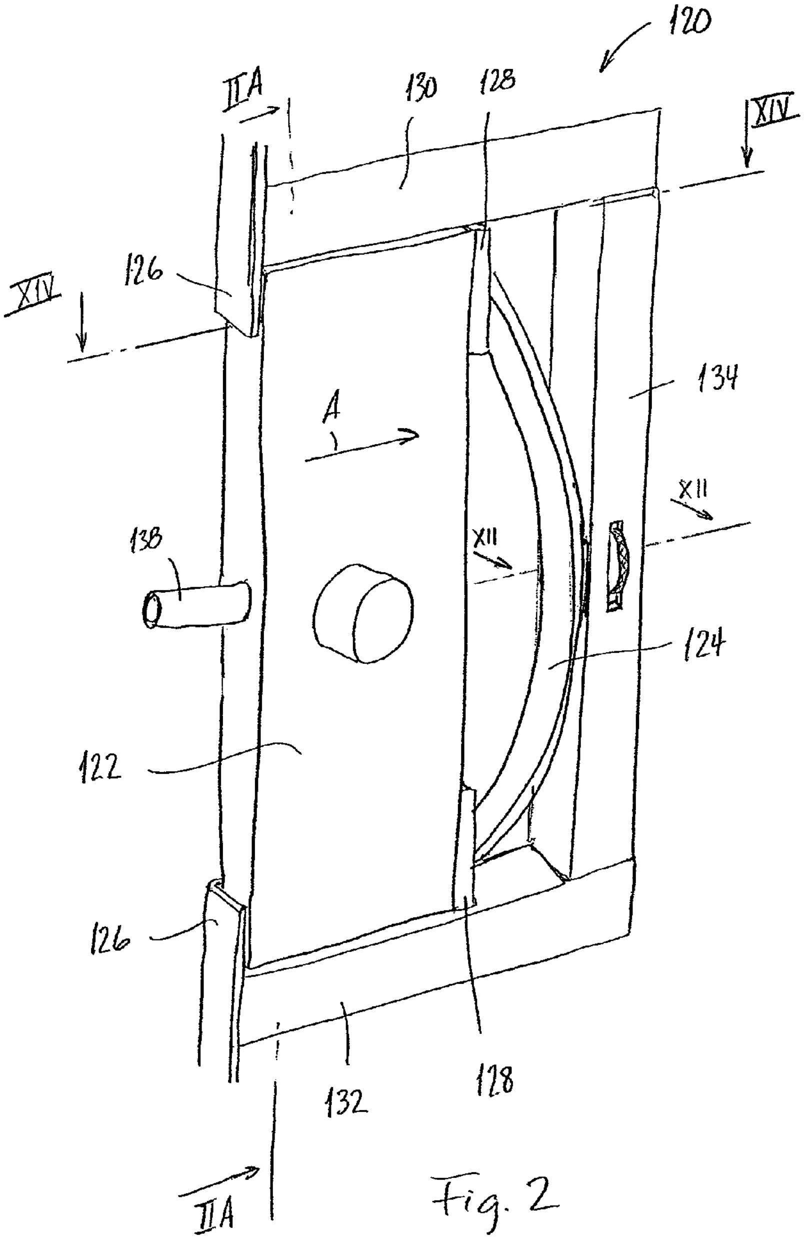
FIG. 2 is a perspective view of a locking mechanism of the door assembly of FIG. 1 with the cover removed.
Figure 2A:
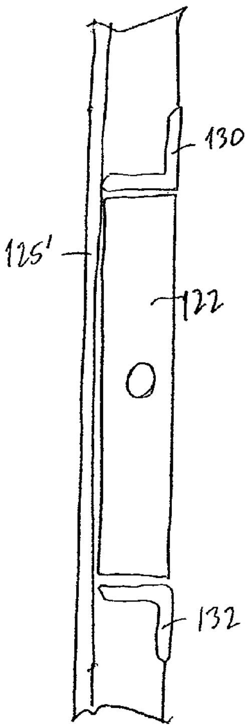
FIG. 2A is an end view of locking mechanism of FIG. 2 in the door from the direction IIA.
Figure 3:
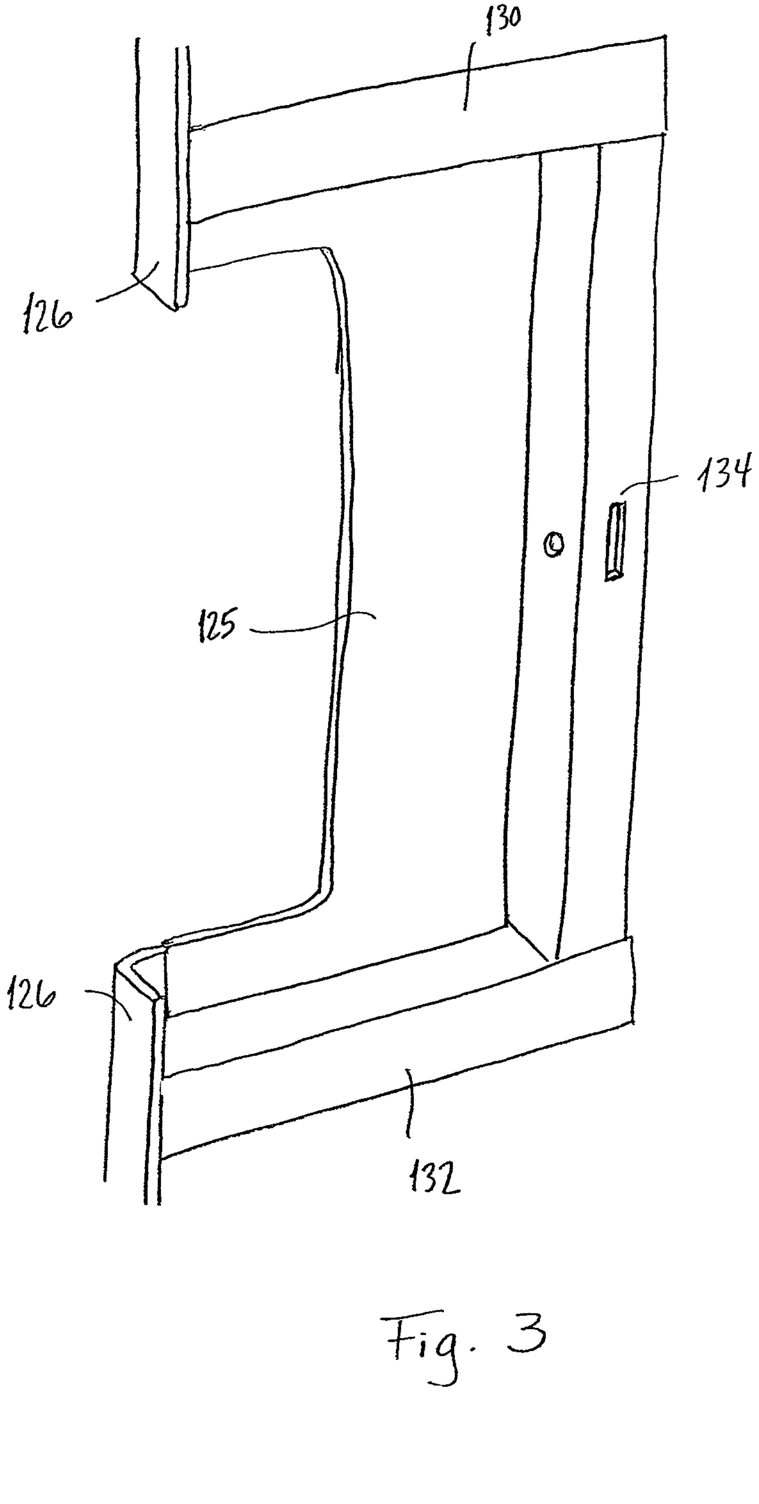
FIG. 3 is a perspective view of a cutout space of the door of the assembly of FIG. 1.

FIG. 2 is a more detailed view of the lock mechanism 120 with the reset tool 200 and the front side cover 125 removed. A cutout space is defined in the door 100 between an upper support 130, a lower support 132, and a side support 134 (see also FIGS. 2A and 3). These supports 130, 132, 134 may, for example, be made from angle iron. The front side cover 125 can be connected to the supports 130, 132, 134 by threaded connectors or any other known or hereafter developed connecting device or means. The rear side of door 100 also has a rear side cover 125' (shown in FIG. 3) which may be removable as is the front side cover 125 or may alternatively be an integral part of the door 100. A movable element 122 is arranged between the upper and lower supports 130, 132 and is urged against stop elements 126 by a spring 124 mounted on side support 134. The stop elements 126 may comprise angle iron sections welded along the second lateral side 106 of the door 100. The movable element 122 includes a bolt 138, which is receivable in the bolt hole 119 when the door 100 is closed. Firefighters are currently trained to pry open the door at a location within six inches from the bolt. Accordingly, the distance between the bolt 138 and each of the stop elements 126 should be at least six inches. However, if the training specifications are amended, the distance between the bolt 138 and each of the stop elements 126 can be changed accordingly to meet the new requirements.

The spring 124 comprises a leaf spring made of spring steel having a center section **124*a* and two end sections 124*b*, 124*c*. The center section 124*a* is connected to the side support 134 and the ends 124*b*, 124*c* rest resiliently on the movable element 122. In one embodiment, TEFLON strips 128 are arranged between the ends 124*b*, 124*c* of the spring and the movable element 122 to reduce wear and increase the life of the lock mechanism. Other embodiments may omit the TEFLON strips 128. Instead of being connected against the side support 134, the center section 124*a* of the leaf spring may be connected against the movable element 122. In this alternative embodiment, the ends 124*b*, 124*c* rest against the side support 134 via the TEFLON strips 128. Instead of a leaf spring, the spring 124 may alternatively be one or more leaf springs arranged between the side support 134 and the movable element 122**. Alternatively, coil springs are used.

Figure 2B:
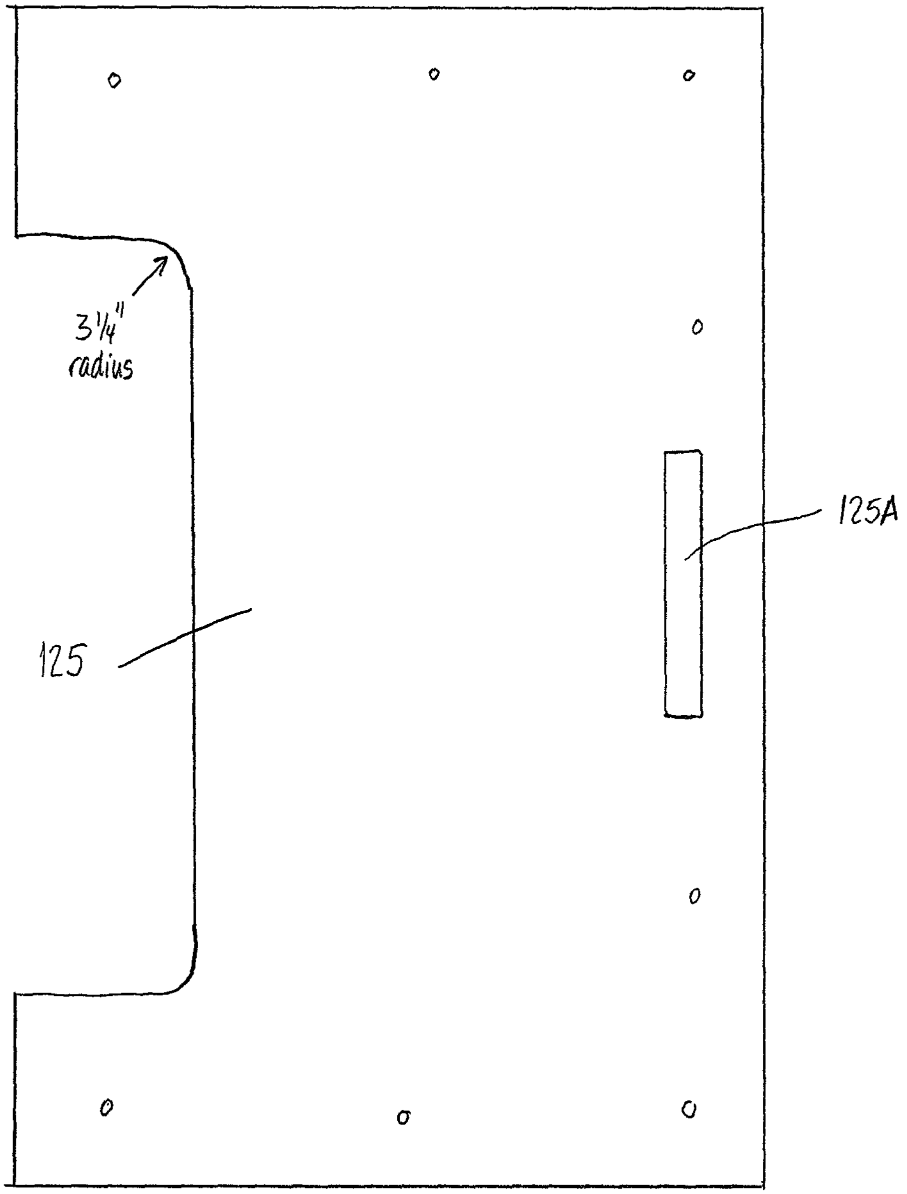
FIG. 2B is a side view of a spring cover for the locking mechanism of FIG. 2 in the door.

In a preferred embodiment, the spring assembly discussed above is covered with the front side cover 125 such as the one shown in FIG. 2B. The spring cover includes a spring force adjuster slot 125A. In a preferred embodiment, a spring force adjustment knob protrudes through the adjuster slot as will be described in more detail below.

Figure 4:
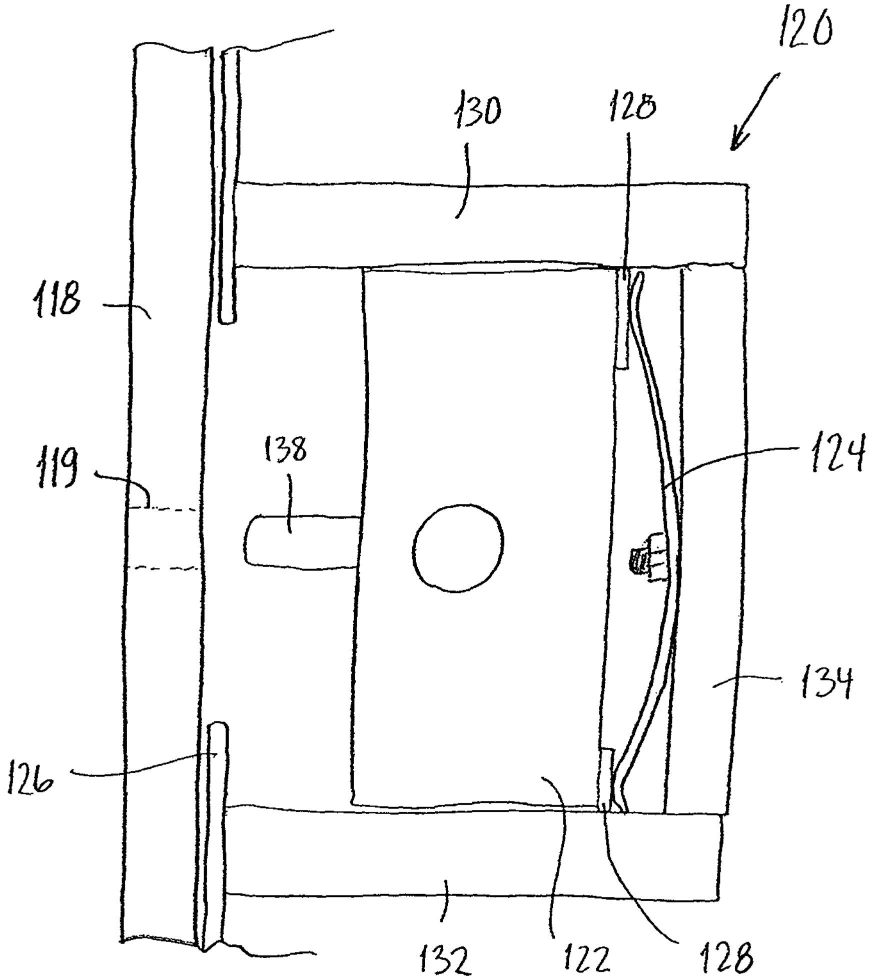
FIG. 4 is a front view of the locking mechanism as in FIG. 2 in a pried-open position.

During a practice drill, the movable element 122 is moved by the prying tool 152 against the urgency of the spring 124 until the bolt 138 is removed from the bolt hole 119 and the door 100 can be opened, i.e., to the position shown in FIG. 4. To accomplish this, the prying tool 152 is forced between the movable element 122 and the reinforced section 118 of the door frame.

Figure 5:
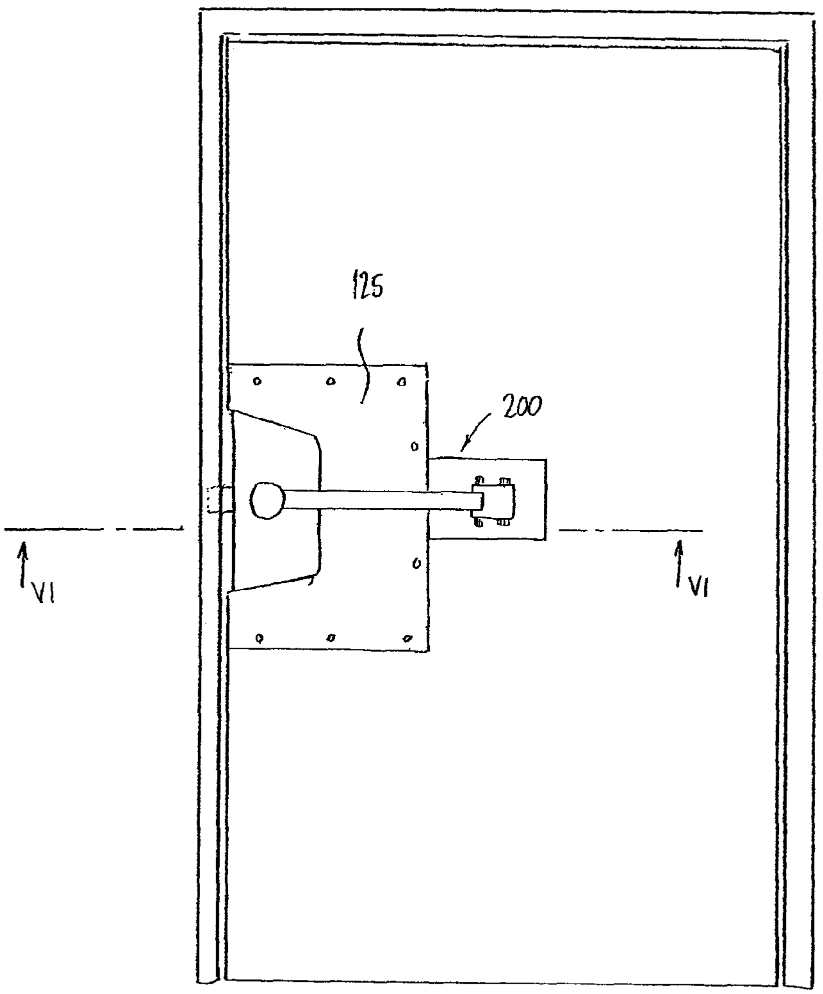
FIG. 5 is a front view of the door of FIG. 1 showing a reset mechanism.
Figure 6:
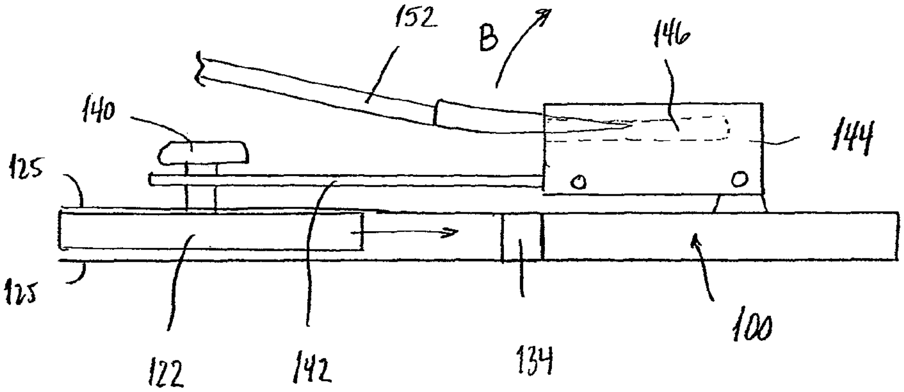
FIG. 6 is a side view of the reset mechanism along arrows VI in FIG. 5.

As shown in FIGS. 5 and 6, a first embodiment of the reset mechanism 200 includes a pivoting element 144 pivotally connected to the door 100. A connecting element 142 is connected between the pivoting element 144 and a knob 140 on the movable element 122. The pivoting element 144 has a cavity in which the end of the Halligan tool 152 or other prying tool can be inserted. The Halligan tool is used to pivot the pivoting element 144 in the direction of arrow B in FIG. 6. As the pivoting element 144 pivots, the movable element 122 is moved against the urgency of the spring 124. The purpose of the reset mechanism is to allow the movable member 122 to be moved against the urgency of the spring 124 to a position as shown in FIG. 4 when the door 100 is open so that the bolt 138 does not interfere with the frame when the door 100 is moved to the closed position. Once the door 100 is in the closed position, the Halligan tool 152 is pivoted back to the position shown in FIG. 6 and the bolt 138 on the movable element enters the bolt hole 119 in the frame. The reset mechanism 200 allows the movable element 122 to be easily moved against the urgency of the spring 124 for closing the door 100 after the door has been opened during a training exercise.

Figure 7:
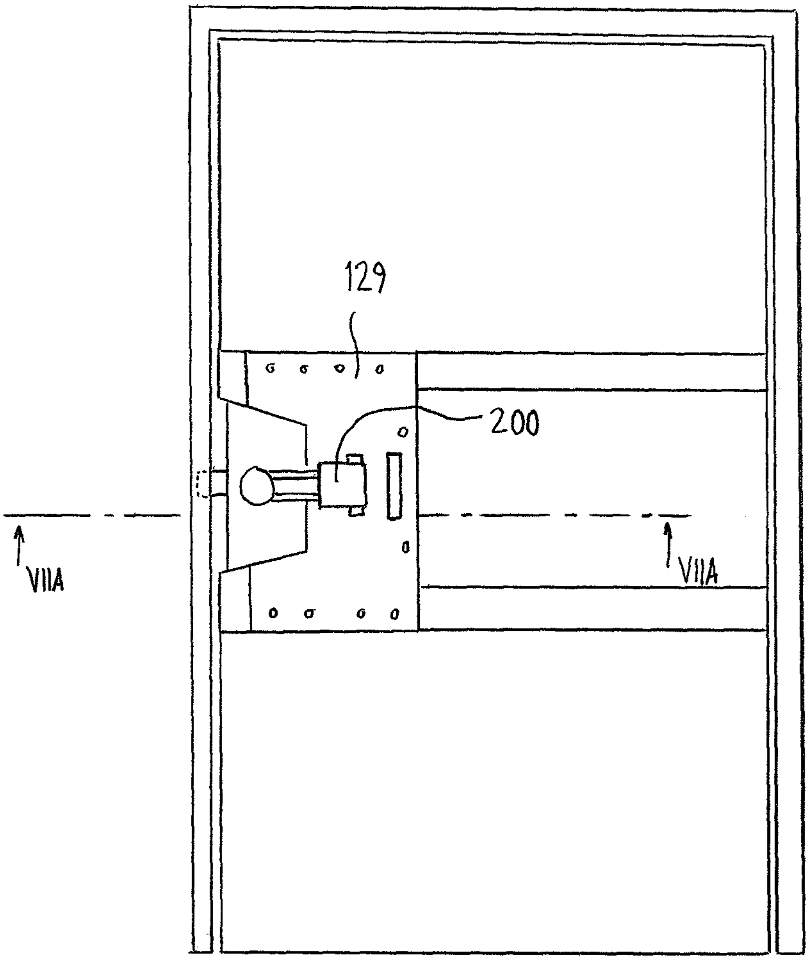
FIG. 7 is a front view of a door showing another reset mechanism.
Figure 7A:
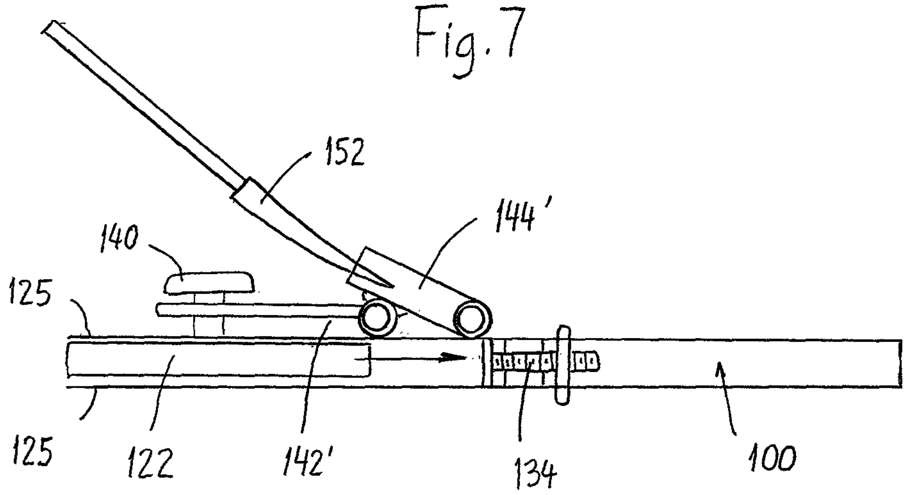
FIG. 7A is a side view of the another reset mechanism along arrows VITA in FIG. 7.

A second embodiment of the reset mechanism is shown in FIGS. 7 and 7A The reset mechanism 200 includes a pivoting element 144' pivotally connected to the door 100. A connecting element 142' is connected between the pivoting element 144' and a knob 140 on the movable element 122. The pivoting element 144' has a cavity in which the end of the Halligan tool 152 or other prying tool can be inserted. The Halligan tool is used to pivot the pivoting element 144' in the direction of arrow B in FIG. 6. As discussed in greater detail below, the rest position of the pivoting element 144' is not parallel to the door but extends from the door 100 at an angle. As the pivoting element 144' pivots, the movable element 122 is moved against the urgency of the spring 124. The purpose of the reset mechanism is to allow the movable member 122 to be moved against the urgency of the spring 124 to a position as shown in FIG. 4 when the door 100 is open so that the bolt 138 does not interfere with the frame when the door 100 is moved to the closed position. Once the door 100 is in the closed position, the Halligan tool 152 is pivoted back to the position shown in FIG. 7A and the bolt 138 on the movable element enters the bolt hole 119 in the frame. The reset mechanism 200 allows the movable element 122 to be easily moved against the urgency of the spring 124 for closing the door 100 after the door has been opened during a training exercise.

Figure 8:
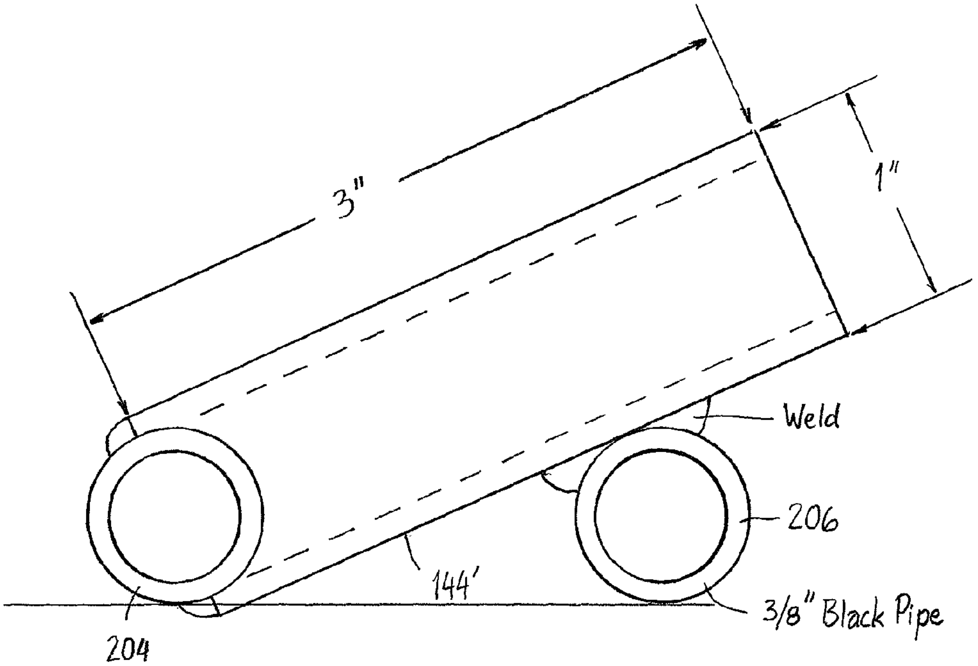
FIG. 8 is a detailed view of the pivoting element of FIG. 7.
Figure 9:
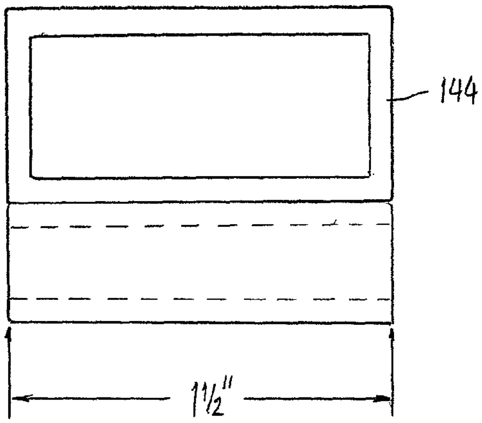
FIG. 9 is a detailed view of the pivoting element of FIG. 7.

FIGS. 8-9 are detailed views of pivoting element 144'. As shown, the pivoting element 144' is a 1 inch×1½ inch rectangular tube about 3 inches long. A first 3/8 inch pipe portion 204 is welded to a first end of pivoting element 144'. Pivoting element 144' is pivotably coupled to door 100 via the tube portion 204. The tube portion 204 is welded to the pivoting element 144'either in a location that the weld does not interfere with the pivoting of pivoting element 144' and/or the weld is ground down so that it is flush on the door 100. A second section of ⅜ inch pipe 206 is welded to pivoting element 144'. This second pipe section 206 is attached to connecting element 142' as described below. The dimensions are given as an example and are not meant to limit the claimed invention.

Figure 10:
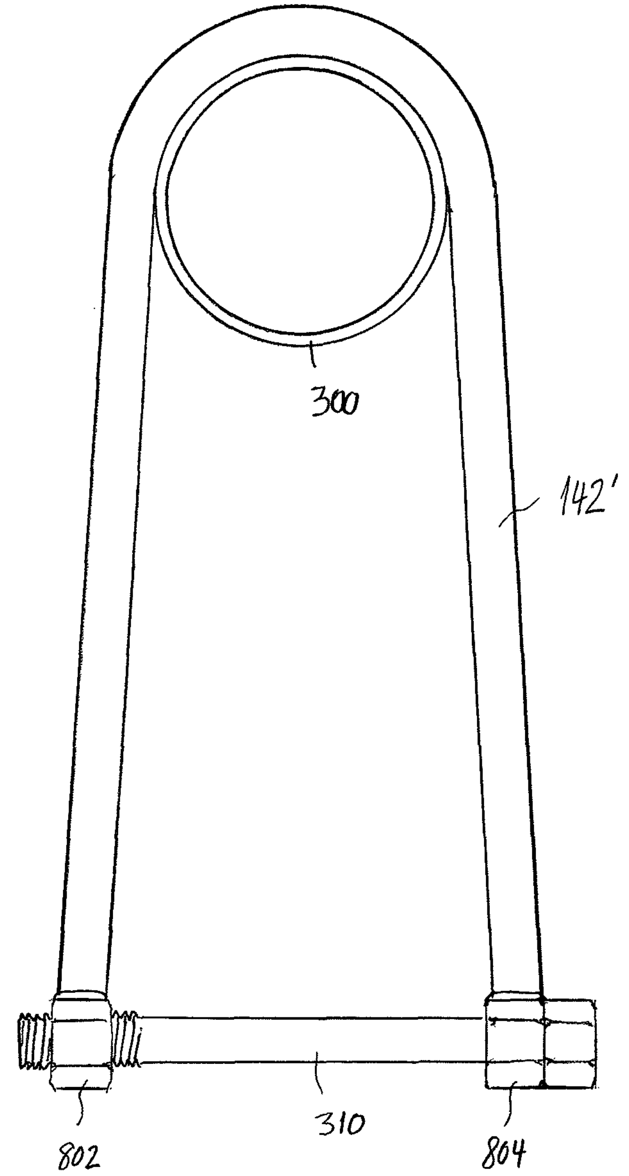
FIG. 10 is a detailed view of the connecting element of FIG. 7.

FIG. 10 is a detailed view of the connecting element 142' of FIG. 7A. Connecting element 142' is configured at a first end to attach to doorknob 140. Preferably, the first end of connecting element 142' includes a ¾ inch black pipe doorknob extension 300. The doorknob extension 300 is preferably configured to mount to the door 100 with the doorknob 140. While the connecting element 142' is shown wrapped around the doorknob extension 300, it can also be welded to the doorknob extension 300. Alternatively, two separate connecting rods connect a cap screw 310 to doorknob extension 300.

The connecting element 142' is preferably 5/16 inch hot rolled round bar. Ends of the bar are attached to a cap screw assembly 310 by nuts 802, 804 that are welded to the connecting element 142'. The nut 804 is drilled out so that the cap screw assembly 310 slides therethrough and nut 802 is threaded onto the cap screw assembly 310. The cap screw assembly 301 is pivotably installed in black pipe 206 of the pivoting element 144'. As stated above, the dimensions are provided as examples and are not meant to restrict the invention. While depicted using a cap screw and nuts, other alternative embodiments are envisioned using welded components without threads. Any known or hereafter developed connecting element that functions to slides the movable element 122 when the pivoting element 144' is pivoted may alternatively be used.

Figure 11:
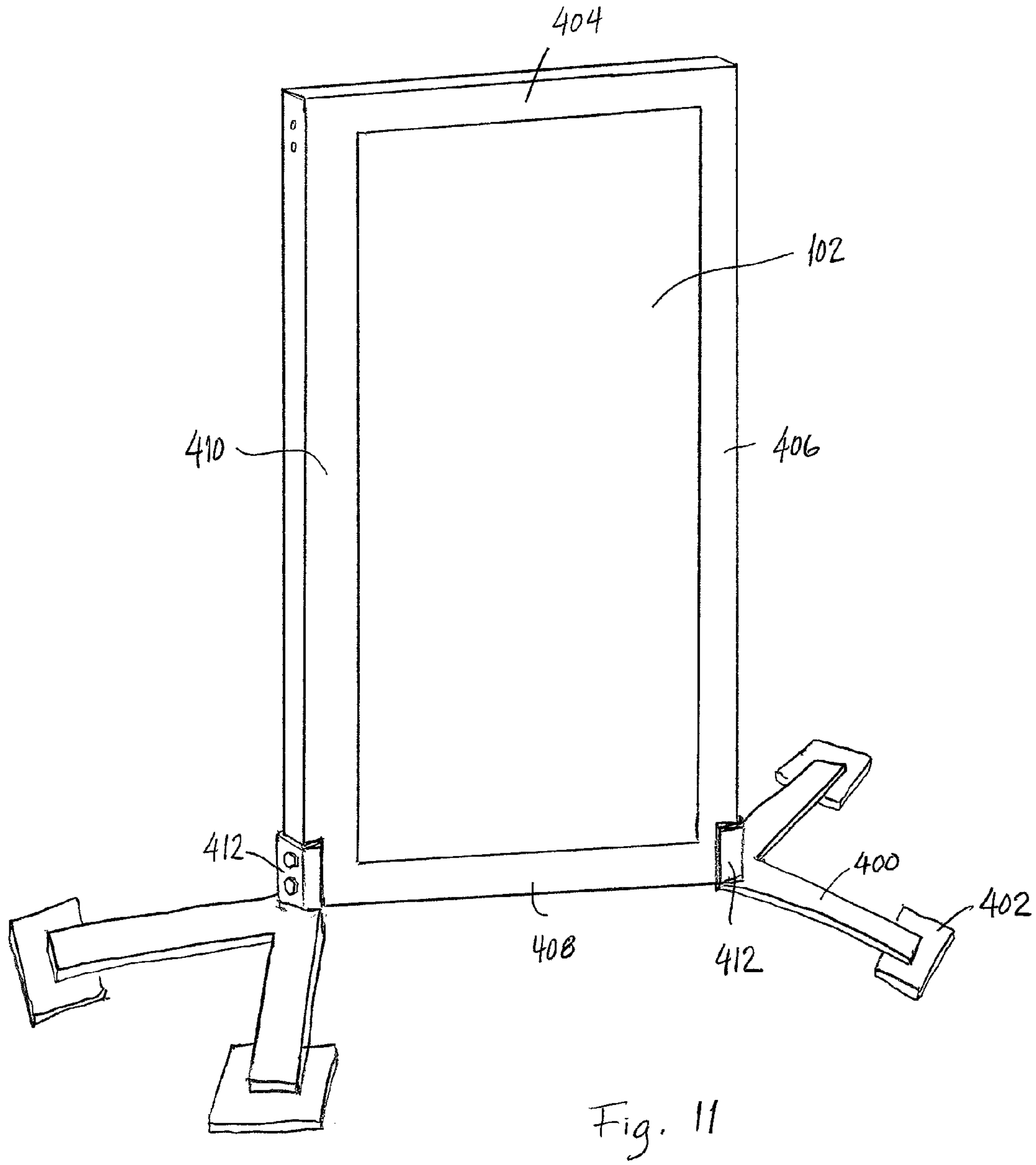
FIG. 11 is a perspective view of a portable fire door assembly according to an embodiment of the present invention.

It should be noted that the fire training door assembly could be permanently installed in a wall at a training facility. Alternatively, the fire training door assembly is a portable unit as shown in FIG. 11. The fire training door assembly includes legs 400. Each leg 400 has a pad 402 to improve the stability of the fire training door assembly. In this portable embodiment, the frame comprises a top rail 404 and bottom rail 406, and side rails 406, 410. The top and bottom rails 404, 406 are made from structured rectangular tubing 2" by 4". One of the sides 406 is also made from the same structured rectangular tubing. The other side 410, which faces the lock mechanism (not shown in FIG. 11), is 3" by 4" rectangular tubing. The legs 400 are connected on each side of the door by a bracket 412. To switch the fire training door assembly from right hand opening to left hand opening, the brackets 412 can be removed and reattached on the other end of the door, and the door turned upside down. In this manner, firefighters can train to open both right hand and left hand door configurations.

Figure 12:
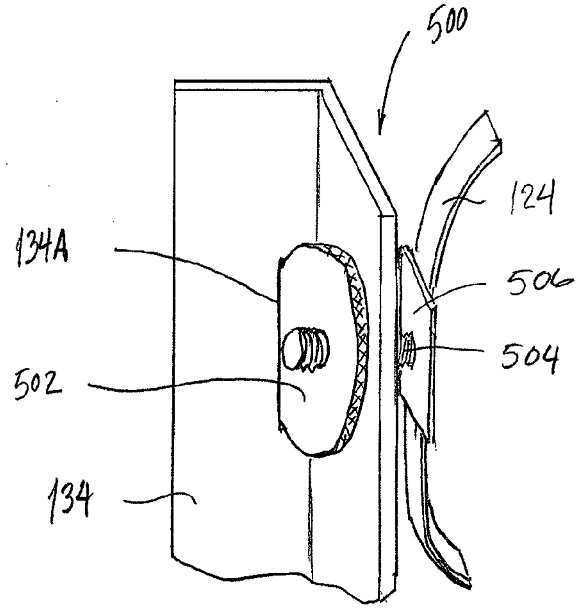
FIG. 12 is a perspective view a spring adjustment device from a rear side of the door assembly of FIG. 2 along lines XII-XII.
Figure 13A:
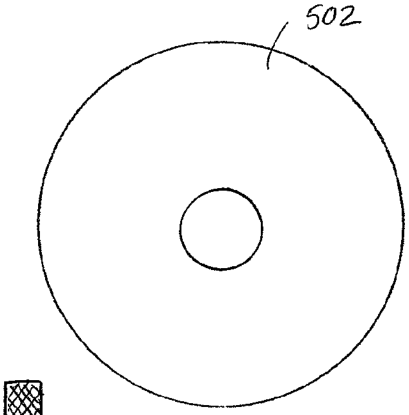
FIGS. 13A-13C are views of the adjustment device.
Figure 13C:
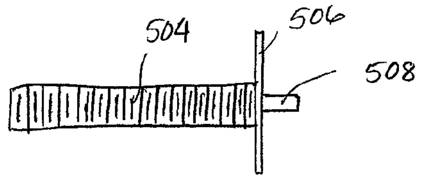
Figure 13B:
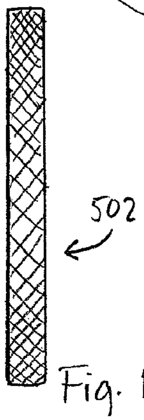

For training purposes, the force required to open the door is variable. In a preferred embodiment, the leaf spring includes a spring force adjustment device 500. As shown in FIG. 12, the spring force adjustment device moves a portion of the leaf spring 124 (here the center) toward or away from the lock mechanism so that it requires more or less force to release the lock bolt 138 from the door jamb. FIGS. 13A-13C provide details for the spring force adjuster device 500. An adjuster knob 502 has a knurled edge and is restrained from axial motion by receipt in a slot in the side support 134 so that the adjuster knob 502 moves a threaded rod 504 inserted therethrough when the adjuster knob is rotated. The adjuster knob 502 may, for example, be in the form of a circular-shaped disc. The threaded rod 504 is at least one of either permanently attached to the leaf spring 124 or includes a push plate 506 to contact the leaf spring 124. In a further embodiment, the spring force adjustment device may have a projection including another threaded rod or a boss 508 that is received in a through hole in the center of the leaf spring 124 for positioning the spring force adjustment device 500 and the spring 124 relative to each other.

Figure 14:
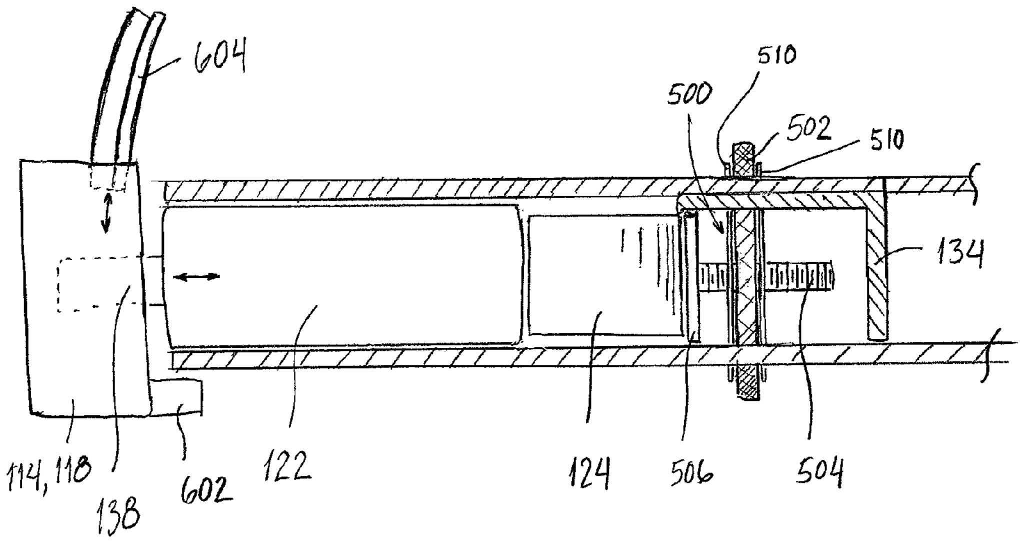
FIG. 14 is a top view of the spring adjustment device of the door assembly of FIG. 2 along lines XIV-XIV.

FIG. 14 is a top sectional view of the spring force adjustment device 500 in the door (the reset mechanism is not shown in this Figure for clarity). As shown, the adjuster knob 502 protrudes from both door surfaces for easy access. In the embodiment shown in FIG. 14, the leg of the angle iron forming the side support 134 that extends from the front to the rear side of the door faces away from the movable element 122. Accordingly, no through hole is required for the rod 504. As can be seen from this drawing, the push plate 506 is dimensioned to be the same width as the cutout in the door housing the lock mechanism 120. This prevents the push plate 506 from rotating with the adjuster knob 502 and thus causes the rod 504 to be moved axially when the adjuster knob 502 is rotated, as described above. Accordingly, the rod 504 and push plate 506 are not required to be connected directly to the spring 124. Also shown in FIG. 14 are thrust washers 510 arranged on the two sides of the adjuster knob 502. The thrust washers 510 facilitate rotation of the adjuster knob 502 by a user.

Further, FIG. 14 shows that the vertical support 114 adjacent the lock mechanism 120 includes a door stop 602 and an extended ramp 604 to increase the difficulty of the training exercise. The extended ramp 604 requires the movable element 112 to be held in the pried open position until the door is opened far enough for the bolt 138 to clear the extended ramp 604. Preferably, the length of the extended ramp and the bolt are also adjustable along the arrows shown in FIG. 15.

For example, the extended ramp 604 may have a profile that is slidably inserted in a slot in the vertical support 114, 118 and held by a set screw (not shown) and the bolt 138 may be threadably inserted in the movable element 122.

Figure 15:
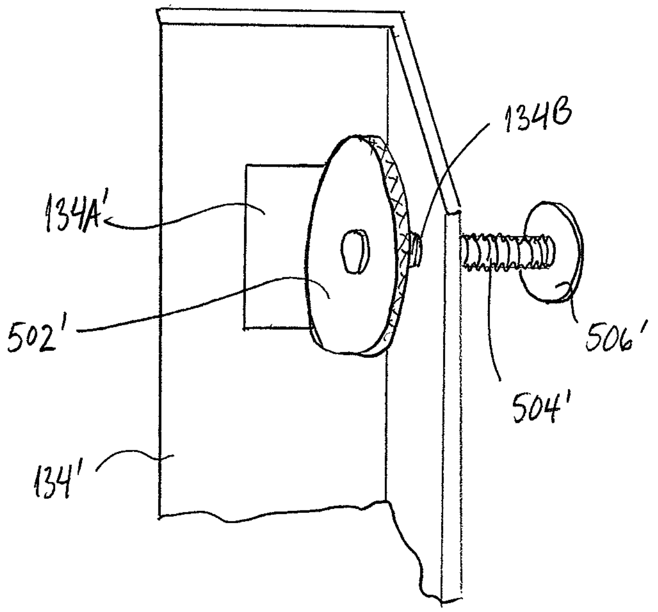
FIG. 15 is a perspective view of another embodiment of the spring adjustment device.

In an alternative embodiment shown in FIG. 15, the knob 502' is directly connected to the rod 504', i.e., by welding, such that the rod 504' rotates with the knob. In this embodiment, the rod 502' is threadably inserted in a threaded hole 134B in the side support 134 (or alternatively a part connected to the side support). In this embodiment, the knob 502' moves axially with the rod 504'. Accordingly, the slot 134A' must be large enough to permit the required adjustment movement. Furthermore, the plate 506' in this embodiment must be dimensioned to allow rotation of the rod 504'. For example, the plate 506' could be circular.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A fire training door assembly, comprising:

a door frame including first and second vertical posts and an upper horizontal beam connecting said first and second vertical posts;

a door having a front, a rear, a first lateral side hingably connected to said first vertical post and a second lateral side, said door defining a cutout space along said second lateral side, said cutout space having an upper end, a lower end, and a side portion, said cutout having an open side at one of the front and rear of said door;

a lock element movably arranged in said cutout space and extending between said upper end and said lower end;

a cover nondestructively removably connected to said door to cover at least a portion of said open side such that said lock element is maintained in said cutout space, wherein said lock element is removable from said open side when said cover is removed from said door; and a spring arranged between said lock element and said side portion urging said lock element toward said second side of said door against a stop element arranged on said door, said lock element being movable against an urgency of said spring toward said first lateral side, whereby the forces required to move the lock element against the spring simulate the forces required to pry open a steel door;

wherein said spring is a leaf spring comprising a central section and two end sections, said central section being connected to one of said lock element and said side portion of said space, and said end section resting resilienty against the other of said lock element and said side portion of said space.

2. The fire training door assembly of claim 1, wherein said door comprises a top rail and a bottom rail defining the top and bottom of said cutout space and a vertical support defining said side portion of said cutout space.

3. The fire training door assembly of claim 2, wherein said top rail, said bottom rail, and said vertical support are each made with angle iron.

4. The fire training door assembly of claim 1, wherein said lock element comprises a bolt which is received in hole in the second vertical post when said door is in the closed position and the locking element is urged against the stop element.

5. The fire training door assembly of claim 1, wherein said fire training door assembly is portable.

6. The fire training door assembly of claim 5, further comprising legs attached at a first position proximate a bottom end of said door frame by brackets to support the door frame in an upright position.

7. The fire training door assembly of claim 6, wherein said legs and bracket are non-destructively removable from said bottom end and connectable proximate an opposing end of said door frame to support the door frame in an upside down position, wherein the door is in one of a right hand and left hand door configuration in the upright position and is in the other of the right hand and left hand configuration in the upside-down position.

8. The fire training door assembly of claim 1, further comprising a reinforced section at a central portion of said second vertical post, said reinforced section extending at least from said lower end to said upper end of said cutout space.

9. The fire training door assembly of claim 1, wherein said stop includes a projection extending into said cutout space along said second lateral side of said door.

10. A fire training door assembly, Comprising:

a door frame including first and second vertical posts and an upper horizontal beam connecting said first and second vertical posts;

a door having a front, a rear, a first lateral side hingably connected to said first vertical post and a second lateral side, said door defining a cutout space along said second lateral side, said cutout space having an upper end, a lower end, and a side portion, said cutout having an open side at one of the front and rear of said door;

a lock element movably arranged in said cutout space and extending between said upper end and said lower end;

a cover nondestructively removably connected to said door to cover at least a portion of said open side such that said lock element is maintained in said cutout space, wherein said lock element is removable from said open side when said cover is removed from said door;

a spring arranged between said lock element and said side portion urging said lock element toward said second side of said door against a stop element arranged on said door, said lock element being movable against an urgency of said spring toward said first lateral side, whereby the forces required to move the lock element against the spring simulate the forces required to pry open a steel door, said lock element comprising a bolt which is received in a hole in the second vertical post when said door is in the closed position and the locking element is urged against the stop element; and a reset device including a pivoting element having a first end pivotably connected to said door and a second end, and a connecting element having a first end connected to said second end of said pivoting element and a second end of said connecting element being connected to said movable element, said pivoting element being pivotable for moving the movable element against the urgency of said spring to an open position in which the bolt is clear of interference with the second vertical post.

11. The fire training door assembly of claim 10, wherein said pivoting element includes a cavity for receiving an end of a prying tool used to pry open the door.

12. The fire training door assembly of claim 10, wherein said first end of said pivoting element is mounted on said cover.

13. A fire training door assembly, comprising:

a door frame including first and second vertical posts and an upper horizontal beam connecting said first and second vertical posts;

a door having a front, a rear, a first lateral side hingably connected to said first vertical post and a second lateral side, said door defining a cutout space along said second lateral side, said cutout space having an upper end, a lower end, and a side portion, said cutout having an open side at one of the front and rear of said door;

a lock element movably arranged in said cutout space and extending between said upper end and said lower end;

a cover nondestructively removably connected to said door to cover at least a portion of said open side such that said lock element is maintained in said cutout space, wherein said lock element is removable from said open side when said cover is removed from said door;

a spring arranged between said lock element and said side portion urging said lock element toward said second side of said door against a stop element arranged on said door, said lock element being movable against an urgency of said spring toward said first lateral side, whereby the forces required to move the lock element against the spring simulate the forces required to pry open a steel door; and an adjustment device operable to adjust the urgency of said spring against which said lock element is movable, wherein said adjustment device comprises a first element movable relative to said side portion of said cutout space and a user rotatable second element, said first element being translatable toward or away from said lock element to increase or decrease the urgency of said spring in response to rotation of said second element, and said second element is a circular-shaped disc that rotates in a plane that is perpendicular to a movement direction of said lock element.

14. The fire training door assembly of claim 13, wherein an edge of said second element protrudes from a slot on at least one of said front side and rear side of said door, thereby providing a user manipulable portion allowing user rotation of the second element to adjust the urgency of the spring.

15. The fire training door assembly of claim 14, wherein said second element further comprises a knurled edge.

16. A fire training door assembly, comprising:

a door frame including first and second vertical posts and an upper horizontal beam connection said first and second vertical posts;

a door having a front, a rear, a first lateral side hingably connected to said first vertical post and a second lateral side, said door defining a cutout space along said second lateral side, said cutout space having an upper end, a lower end, and a side portion, side cutout having an open side at one of the front and rear of said door;

a lock element movably arranged in said cutout space and extending between said upper end and said lower end;

a cover nondestructively removably connected to said door to cover at least a portion of said open side such that said lock element is maintained in said cutout space, wherein said lock element is removable from said open side when said cover is removed from said door;

a spring arranged between said lock element and said side portion urging said lock element toward said second side of said door against a stop element arranged on said door, said lock element being movable against an urgency of said spring toward said first lateral side, whereby the forces required to move the lock element against the spring simulate the forces required to pry open a steel door; and an extended ramp extending in a door opening direction from said second vertical post at a position of a bolt on said lock element.

* * * * *